US009985905B2

(12) United States Patent
Kampas et al.

(10) Patent No.: US 9,985,905 B2
(45) Date of Patent: May 29, 2018

(54) SYSTEM AND METHOD FOR CLOUD ENTERPRISE SERVICES

(71) Applicant: Accenture Global Services Limited, Dublin (IE)

(72) Inventors: Sean Robert Kampas, Hanover Park, IL (US); Adam Ryan Tarkowski, Chicago, IL (US); Charles Michael Portell, Chicago, IL (US); Nina Bhatti, Naperville, IL (US)

(73) Assignee: Accenture Global Services Limited, Dublin (IE)

( * ) Notice: Subject to any disclaimer, the term of this patent is extended or adjusted under 35 U.S.C. 154(b) by 0 days. days.

(21) Appl. No.: 14/865,917

(22) Filed: Sep. 25, 2015

(65) Prior Publication Data

US 2016/0014042 A1 Jan. 14, 2016

Related U.S. Application Data

(63) Continuation of application No. 13/223,288, filed on Aug. 31, 2011, now Pat. No. 9,235,442.
(Continued)

(51) Int. Cl.
*G06F 15/173* (2006.01)
*H04L 12/927* (2013.01)
(Continued)

(52) U.S. Cl.
CPC ............... *H04L 47/80* (2013.01); *G06F 9/50* (2013.01); *G06Q 10/0631* (2013.01);
(Continued)

(58) Field of Classification Search
CPC .... G06Q 10/06; G06Q 10/0631; H04L 63/10; H04L 41/0893; H04L 41/0806; G06F 9/5072; G06F 11/3006
See application file for complete search history.

(56) References Cited

U.S. PATENT DOCUMENTS 6,725,378 B1 4/2004 Schuba
6,925,642 B1 8/2005 Commander
(Continued)

FOREIGN PATENT DOCUMENTS

WO WO 2010035281 A1 4/2010

OTHER PUBLICATIONS

Buyya, et al., "Market-Oriented Cloud Computing Vision, Hype and Reality for Delivering IT Services as Computing Utilities," High Performance Computing and Communications, Sep. 25, 2008, pp. 5-13, HPCC 08, 10th IEEE International Conference, Piscataway, New Jersey.
(Continued)

*Primary Examiner* — Shean Tokuta
(74) *Attorney, Agent, or Firm* — Brinks Gilson & Lione

(57) ABSTRACT

Novel methods and systems are provided for integrating multi-vendor cloud computing operations and architectures by using service-oriented orchestration to create a vendor and platform agnostic cloud computing framework. This approach aggregates core cloud computing functions including service provisioning, automating work flows, and data and usage monitoring across integrated services, thereby improving a data centers ability to execute operations quickly, under standardized protocols and with consistent quality of service.

21 Claims, 8 Drawing Sheets

Related U.S. Application Data

(60) Provisional application No. 61/390,037, filed on Oct. 5, 2010.

(51) Int. Cl.
*G06F 9/50* (2006.01)
*G06Q 10/06* (2012.01)
*H04L 29/08* (2006.01)

(52) U.S. Cl.
CPC ............ *H04L 67/10* (2013.01); *G06F 9/5072* (2013.01); *G06Q 10/06* (2013.01)

(56) References Cited

U.S. PATENT DOCUMENTS

| | | | |
|---|---|---|---|
| 6,963,828 B1 | 11/2005 | McDonald | |
| 7,249,176 B1 | 7/2007 | Salas et al. | |
| 7,376,693 B2 | 5/2008 | Neiman et al. | |
| 7,668,703 B1 | 2/2010 | Rolia | |
| 7,747,750 B1 | 6/2010 | Simon et al. | |
| 8,341,270 B2 | 12/2012 | Mazzaferri et al. | |
| 8,484,355 B1* | 7/2013 | Lochhead | H04L 41/0806 709/222 |
| 8,886,806 B2 | 11/2014 | Tung et al. | |
| 2003/0200300 A1 | 10/2003 | Melchione | |
| 2004/0006589 A1 | 1/2004 | Maconi et al. | |
| 2004/0111506 A1 | 6/2004 | Kundu | |
| 2005/0044220 A1 | 2/2005 | Madhavan | |
| 2005/0080838 A1 | 4/2005 | Colby et al. | |
| 2005/0149940 A1* | 7/2005 | Calinescu | G06F 9/5061 718/104 |
| 2006/0153090 A1 | 7/2006 | Bishop | |
| 2007/0043860 A1 | 2/2007 | Pabari | |
| 2008/0091806 A1 | 4/2008 | Shen | |
| 2008/0114624 A1 | 5/2008 | Kitts | |
| 2008/0244233 A1 | 10/2008 | Wilson | |
| 2008/0244579 A1 | 10/2008 | Muller | |
| 2008/0250267 A1 | 10/2008 | Brown | |
| 2009/0083390 A1 | 3/2009 | Abu-Ghazaleh et al. | |
| 2009/0300210 A1 | 12/2009 | Ferris | |
| 2009/0327495 A1 | 12/2009 | Betts-LaCroix et al. | |
| 2010/0042720 A1 | 2/2010 | Stienhans et al. | |
| 2010/0217864 A1 | 8/2010 | Ferris | |
| 2010/0306377 A1* | 12/2010 | DeHaan | G06F 9/5077 709/226 |
| 2010/0332617 A1 | 12/2010 | Goodwin et al. | |
| 2011/0066476 A1* | 3/2011 | Lewis | G06Q 30/02 705/7.29 |
| 2011/0087776 A1 | 4/2011 | Tabone et al. | |
| 2011/0087783 A1 | 4/2011 | Annapureddy et al. | |
| 2011/0131306 A1* | 6/2011 | Ferris | G06F 9/5072 709/223 |
| 2011/0166952 A1* | 7/2011 | Manchikanti | G06Q 10/06 705/26.4 |
| 2011/0191838 A1 | 8/2011 | Yanagihara | |
| 2011/0296021 A1* | 12/2011 | Dorai | G06F 9/5072 709/226 |
| 2012/0030356 A1 | 2/2012 | Fletcher | |
| 2012/0124211 A1 | 5/2012 | Kampas et al. | |
| 2013/0166346 A1* | 6/2013 | Al-Zuhair | G06Q 10/0637 705/7.28 |
| 2014/0114680 A1* | 4/2014 | Mills | G06F 19/363 705/2 |
| 2014/0172782 A1 | 6/2014 | Schuenzel et al. | |

OTHER PUBLICATIONS

Prodan, et al., "A Survey and Taxonomy of Infrastructure as a Service and Web Hosting Cloud Providers," Oct. 13, 2008, pp. 17-25, 10$^{th}$ IEEE International Conference on Grid Computing, Piscataway, New Jersey.

Qian, et al., "Cloud Computing: An Overview," Jan. 1, 2009, pp. 626-631, Cloud Computing, vol. 5931, Springer-Verlag GmbH, Germany.

Vecchiola, et al., "Aneka: A Software Platform for .NET-based Cloud Computing," 2009, pp. 1-30, IOS Press, Fairfax, Virginia.

Tag Instances, https://elasticbox.com/documentation/managing-your-organization/resource-tags/, downloaded Jul. 20, 2015, pp. 1-8, ElasticBox, Inc., San Francisco, California.

Hector Fernandez, Surprised by your Cloud Bill every month? Try Cross-Cloud Tagging, Oct. 23, 2014, pp. 1-3, ElasticBox, Inc., San Francisco, California.

Cisco Prime Service Catalog 10.1 Adapter Integration Guide, Nov. 2014, pp. 1-364, Cisco Systems, Inc., San Jose, California.

Designing Integrations with Service Link Standard Adapters, Chapter 4, Cisco Prime Service Catalog 10.1 Adapter Integration Guide, Nov. 2014, pp. 1-72, Cisco Systems, Inc., San Jose, California.

Buyya, et al., "Market-Oriented Cloud Computing Vision, Hype and Reality for Delivering IT Services as Computing Utilities," High Performance Computing and Communications, Sep. 25, 2008. pp. 5-13, HPCC 08, 10$^{th}$ IEEE International Conference, Piscataway, New Jersey.

Veecchiola, et al., "Aneka: A Software Platform for .NET-based Cloud Computing," 2009, pp. 1-30, IOS Press, Fairfax, Virginia.

Abele, A., Ontology based configuration of virtual systems in a computer cloud, 4$^{th}$ Baltic Conference Learning in Networks, Aug. 20, 2010, pp. 7-15, Kaunas, Lithuania.

Canadian Intellectual Property Office, Second Office Action for Canada Patent Application No. 2,754,304 dated Oct. 2, 2017, 5 pages.

European Patent Office, European Search Report and Search Opinion for Europe Patent Application No. 11008069 dated Feb. 14, 2012, 8 pages.

* cited by examiner

200

Project Details

203

Project - Environment List  201

[Add Environment]

[🔍 Search]

[Backup] [Clone]

207

| ☐ | Environment Name | Power | Alert | Budget | |
|---|---|---|---|---|---|
| ☐ | Development | 5 of 5 | | $X/Y | More Actions ▼ |
| ☐ | Test | 4 of 5 | | $A/B | More Actions ▼ |
| ☐ | Performance | 5 of 5 | | $M/N | More Actions ▼ |
| ☐ | Production | 3 of 5 | | $A/B | More Actions ▼ |
| ☐ | Q/A | 5 of 5 | | $X/Y | More Actions ▼ |

Environment Summary

205

Project Activity Feed    [Filter ▼]

209

[View More Activity]

Figure 2

Example Computer System 800

SYSTEM AND METHOD FOR CLOUD ENTERPRISE SERVICES

PRIORITY CLAIM

This application claims priority to U.S. patent application Ser. No. 13/223,288, filed Aug. 31, 2011, which claims priority to U.S. provisional application Ser. No. 61/390,037, filed Oct. 5, 2010, both of which are entirely incorporated by reference.

BACKGROUND

Cloud computing provides computation, capacity, networking, and storage on demand. Typically, computing resources such as computing (processing) machines, storage devices, and/or network devices are simulated by one or more virtual machines (VMs). Several VMs may be hosted from a single physical hardware infrastructure resource (e.g., a server). Multiple virtual machines may be associated within a cloud infrastructure to form combinations of resources known as computing environments. Individual consumers of cloud computing services may lease the processing and storage services of one or more virtual machines, distributed among one or more physical infrastructure resources in a cloud data center. Typical cloud computing service agreements are based on a self-service usage model which allows a virtually unlimited amount of computing resources to be dynamically requisitioned, on demand, from a pool of shared computing resources offered by a cloud computing vendor. Thus, instead of grossly over-provisioning (or under-provisioning) initial, static computing resources due to uncertain demands, cloud computing consumers can elastically provision infrastructure resources from the provider's pool only when needed. In addition, the pay-per-use model allows subscribers to pay for the actual consumption instead of for estimated peak capacity.

Although cloud computing allows consumers quicker access to the computing resources relative to traditional enterprise information technology models, cloud computing also presents significant and distinct challenges for enterprise management. These challenges include a lack of visibility and limited control and configurability over resource usage, and additional complexities in managing multiple cloud computing resources. In enterprises, for example, application owners can choose to build a customized infrastructure for their applications from amongst various options and from various vendors. In comparison, a cloud infrastructure is owned and maintained entirely by the cloud providers. Because of the commodity business model, only a limited set of infrastructure components is generally offered—typically, these components include virtual machines, dedicated web application hosts and data storage/static hosts. However, each of these cloud components has significant limitations. For example, a typical cloud component featuring virtual machines may offer limited types of virtual servers and application owners cannot customize the specifications of them. As a result, application owners have little or no control of the underlying infrastructure and have little to no ability to change these infrastructure decisions.

Adding to the complexity of subscribing to cloud computing services, each cloud computing vendor is likely to offer a unique (and limited) suite and selection of these hardware/software resources with varying levels of functionalities, and configurations. Each vendor may also charge different rates for different usage levels and/or may allow or prohibit various configurations and/or access levels. Thus, for any consumer of cloud computing resources, there is the challenge of choosing not only the best (in terms of cost, functionality, accessibility, etc.) configuration of resources for the anticipated usage levels offered by a cloud computing vendor, but the challenge of selecting from among the competing vendors as well.

Due to the various service agreements and available resource configurations proffered by the cloud computing vendors, a cloud computing consumer might find that the best usage of cloud computing resources might be hosting an application with an infrastructure component of one cloud computing vendor, hosting another application on another cloud computing vendor's infrastructure component, and executing a software platform from a third cloud vendor. That is, what may be the best configuration (and vendor) for one application may not necessarily be the best (or even a suitable) configuration for another application. Even for individual applications, an optimal solution may be a combination of different infrastructure components, software, platforms and business processes from several vendors. The consumer may thus be faced with compromising the efficiency of one or more of the applications by hosting them on sub-optimal configurations, or seeking separate vendor solutions for hosting. Integrating these applications hosted on separate cloud computing platforms into a seamless environment often presents additional difficulties as well, as each cloud computing vendor may require different protocols for security and access.

Even more problematic is when individual teams or departments or even individuals within organizations opt to use a preferred cloud computing configuration and vendor. In these cases, orchestration of cloud computing resources from multiple vendors and/or configurations may occur haphazardly and in a non-standardized manner, resulting, in some cases, in a somewhat disparate, unstructured, and disorganized data center architecture. Applying any organization-wide policy management or governance to these applications under such circumstances (e.g., operating under different service agreements and using different resources and configurations) quickly becomes exceedingly impractical, and may require management and oversight on a custom micro (individual) level. For widespread or major changes, this can result in serious delays and significant inefficiency to implement these changes.

In addition, where a data center's architecture lacks a formal structure or standardization, automation policies may be scattered throughout the infrastructure tools and it can be difficult to manage and diagnose policy conflicts between infrastructure tools. For example, if a security policy determines that a web server should be shut down in order to address a security breach, a potential policy conflict may arise from a separate disaster recovery policy that attempts to restart non-operating servers. Reviewing every policy for each infrastructure tool for conflicts and eliminating the conflicts may become a time-consuming and labor-intensive process for large, complex or policy-intensive data centers.

Finally, for large projects with a multitude of roles and contributors, managing access to resources can be limited (if not impossible) within conventional cloud service platforms. Conventional practice allows all users with access to a project environment hosted within a cloud to all of the data and metadata corresponding to the project. However, this can result in confusion and inefficiency for members with limited or specific roles. For example, a user interested only in accrued cloud computing costs (e.g., for accounting) may have little to no interest in the technical specifications of the provisioned resources. Likewise, it may not always be ideal for test engineers to have access to higher level functions and/or sensitive data. Thus, the lack of user access control in typical cloud-hosted projects can result in compromised security, confusion, and other significant disadvantages.

SUMMARY

As a solution to the problems noted above, this disclosure provides novel methods and systems for integrating multi-vendor cloud computing operations and architectures by using service-oriented orchestration to create a vendor and platform agnostic cloud computing framework. This approach aggregates core cloud computing functions including service provisioning, automating work flows, and data and usage monitoring across integrated services, thereby improving a data center's ability to execute operations quickly under standardized protocols and with consistent quality of service.

In an embodiment, a system is implemented which provides cloud computing consumers with the specific tools needed to provision and manage requested cloud computing services from a single web-based portal. These tools may include a scalable service catalog, service item management components, consumption-based reporting components, a centralized storage base, and aggregated alerts and incident management components. In further embodiments, the system may include additional tools for efficiently governing multi-platform cloud computing services. These tools may include components for policy enforcement and management, pay per use services, service-spend management, and for the storage of developed environments and configurations.

According to various embodiments, this system may be implemented as a remotely managed service operable to analyze consumer criteria; requisition and configure resources; deploy applications; orchestrate and manage user policies among a plurality of platforms; and integrate the platforms and applications into a single (or plural, as desired) seamless working environment(s) operable to provide services to a plurality of consumers. Alternatively, the system may be implemented as a privately deployed service which generates dedicated, client-specific solutions deployed within a client's existing data environment (which may comprise both traditional and cloud data services).

According to another embodiment, a method is provided for generating an integrated framework by automatically determining a suggested configuration of computing resources (which may comprise, in whole or in part, instances of cloud computing components) for a user based on the user's queried and provided needs, provisioning the resources from the vendors as needed, orchestrating the resources into an integrated computing environment, and granting access to the integrated framework and user access management capability to the client. Further embodiments facilitate the storage of generated configurations as templates and the referencing of stored templates for even more efficient framework generation.

BRIEF DESCRIPTION OF THE DRAWINGS

The accompanying drawings, which are incorporated in and form a part of this specification, illustrate embodiments of the disclosure and, together with the description, serve to explain the principles of the presently claimed subject matter:

FIG. 2 is an example of user interface for provisioning and managing infrastructure resources in a project, in accordance with embodiments of the present disclosure.

DETAILED DESCRIPTION

Figure 1:
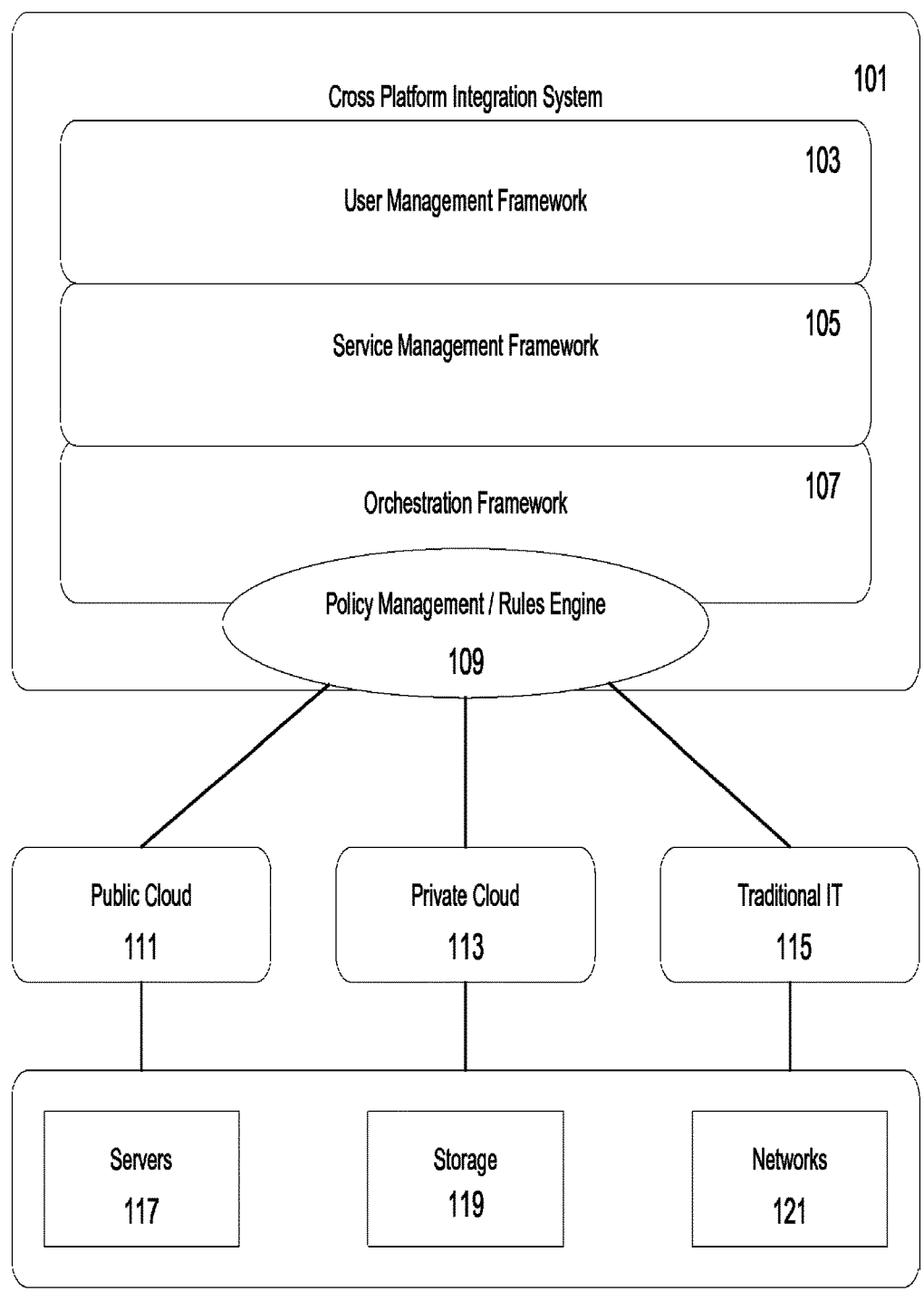
FIG. 1 shows an example of a block diagram of an overview of a framework for integrated provisioning and management of infrastructure resources, in accordance with embodiments of the present disclosure.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known processes, procedures, components, and circuits have not been described in detail as not to unnecessarily obscure aspects and features of the subject matter.

Portions of the detailed description that follow are presented and discussed in terms of a process. Although operations and sequencing thereof are disclosed in a figure herein (e.g., FIG. 7, 8) describing the operations of this process, such operations and sequencing are exemplary. Embodiments are well suited to performing various other operations or variations of the operations recited in the flowchart of the figure herein, and in a sequence other than that depicted and described herein.

Some portions of the detailed description are presented in terms of procedures, operations, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed operation, logic block, process, etc., is here, and generally, conceived to be a self-consistent sequence of operations or instructions leading to a desired result. The operations are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

While the following exemplary configurations are shown as incorporating specific, enumerated features and elements, it is understood that such depiction is exemplary. Accordingly, embodiments are well suited to applications involving different, additional, or fewer elements, features, or arrangements.

As presented in FIG. 1, an integrated managed service framework 100 is provided which aggregates core cloud computing functions including service provisioning, automating workflows, data and usage monitoring across integrated services, and providing user access control into an integrated system 101 accessible through a single portal. These functions, when efficiently combined, may improve a data center's ability to execute operations quickly under standardized protocols and with a consistent quality of service. This integrated managed service framework 100 may further interact with existing orchestration frameworks to integrate traditional information technology data resources 115 with private 113 or public 111 cloud computing resources. In an embodiment, the framework 100 may be implemented by integrating various independent sub-frameworks 103, 105, 107. These sub-frameworks may include, for example, a User Management framework 103 that implements a web-based portal and/or user interface; a Service Management framework 105 for acquiring and managing resources, and mitigating conflicts between them; and an Orchestration framework 107 for performing tasks related to policy management, orchestration, automation, and integration of provisioned resources and services.

Cloud computing consumers may access and perform customary cloud computing management services through a single web-based portal easily accessible to existing and potential consumers. User Management framework 103 provides services such as user access control; account management; and service and support for the storefront and portal. Likewise, management of remotely coupled traditional data center components may also be performed through the portal. This portal may be implemented by the User Management framework 103 as, for example, a single web-based portal which is configured to provide direct access to the consumer to the various other subframeworks within the integrated cloud services framework. The User Management framework 103 may also include the functionality for providing the back-end service and support for users of the web-based portal.

These functions may include (but are not limited to) maintaining and providing a scalable service catalogue that describes the available services and resources from a scalable, user-specific service catalogue. These resources and services may comprise, for example, instances of Infrastructure as a Service (e.g., virtual machines), instances of Platforms as a Service (e.g., specific operating systems), instances of Software as a Service (e.g., applications), and instances of Business Processes as a service (e.g., proprietary workflows). These instances may be offered from a variety of different, sometimes competing public cloud computing vendors. Alternatively, these instances may also comprise instances of a private cloud infrastructure. In still further embodiments, the resources and services may also comprise traditional enterprise data infrastructure components, such as physical devices or virtual private network devices.

In an embodiment, the user is able to select desired resources and/or services to implement in a project or environment configuration directly from the service catalogue through the user interface. In further embodiments, the service catalogue is updated dynamically to reflect the user's previous selections, such that conflicts between offered resources and services are avoided. For example, certain infrastructure components offered by a cloud computing vendor will only run proprietary platforms. Thus, a user selection of such an infrastructure component will have available options for platforms (as displayed in the service catalogue) dynamically limited. Alternatively, a configuration of computing resources may be determined automatically for a user by querying the user with desired system attributes or performance, and selecting a configuration of computing resources (e.g., infrastructure components, platforms, applications, and/or business processes) with the desired attributes or capable of the desired performance.

The service catalogue may be used as an interface for a consumer to provision and configure a new cloud computing environment, for example. In further embodiments, the catalogue may be used to access a storage of previously developed computing environment configurations. The previously developed computing environment and configuration may be fully or partially replicated and/or customized as needed in lieu of generating a completely new cloud computing environment. Once created, the computing environment may be stored in a central storage base, accessible to the user through the web-based portal. In an embodiment, these configurations may also be stored as an environment template in the central storage base, and referenced when necessary. In further embodiments, this storage base may be implemented as a database, such as a Configuration Management Database (CMDB) for example, and accessible through the Orchestration Framework 107 (described below). During a process for generating a set or potential solution of computing resources, the storage base of templates may be referenced and the templates compared to supplied user criteria. A template exactly or substantially matching the user criteria may be supplied as a suggested configuration.

According to still further embodiments, the User Management framework 103 may also include functionality to extend user access control. User Access may be managed for individual users by an authorized user, or through service item management. User Access Control may include user role management features (adding or removing new users, defining user classes/groups, assigning user classes/groups to a user).

Service item management may include, for example, the ability to view—in an instance of the user interface corresponding to a user—a list of provisioned resources for all projects affiliated with the user, and the ability to turn each individual resource on/off and/or to modify the configuration of the resource. This ability may be provided (e.g., accessible) to the user through the web-portal, for example. This list of provisioned resources may also be limited or expanded (e.g., by a project administrator or manager) where necessary to include or exclude data for certain users and/or user groups. For example, a user designated as an accountant and/or affiliated with a financial user group may see a list of provisioned resources and only the data corresponding to billed or account information corresponding to those resources. Other data and or functionality applicable to the resource, such as technical specifications, monitoring, licensing, patching, backup, portability, may be withheld from view for the user. Likewise, a test engineer and/or a user affiliated with a testing user group may be granted access only to data pertaining to application or service testing performed in the project. The aforementioned billing information, along with other data and/or functionality, may be withheld from users identified as test engineers or affiliated with the testing user class or group.

This list of displayed services can also change dynamically, depending on the state of the resource. For instance, if a resource is already off, the service request to turn off the server will not be display/enabled. Other operations performed in the User Management framework 103 may include management of user requests for services and service items of provisioned resources; providing user-specific consumption reporting features which provide the consumer access to consumption, cost and chargeback information (organized by project and/or vendor for example) and notifications (e.g., if a resource such as a server is reaching its utilization threshold, a recommendation to increase memory may be displayed in the user interface.) In an embodiment, modifications to the state and/or configuration of a resource in a computing environment performed by an authorized user will automatically update the computing environment to reflect the modifications.

Policies may be declared by a user through a user interface generated by the User Management Framework 103, for instance. Other features may include functionality for pay-per-use services accounting which monitors and stores the data accessible by a consumer also through the User Management Framework 103. Data management of third party provided services including service usage, pricing, billing and payment may also be provided in the User Management Framework 103. In still further embodiments, system 100 is configured to allow a user to manage (through a web portal) entire provisioned computing environments (or projects comprising sets of servers and resources) in addition to individual components of an environment infrastructure (e.g., a server). Thus, features including (but not limited to) the monitoring, licensing, patching, backup, portability, pricing, billing and payment of entire, aggregate provisioned environments can be effectively managed collectively on a macro level, and across different infrastructure vendors, platforms, and software.

Once a configuration of computing resources for an environment or project is selected, the Service Management Framework 105 will receive the configuration and provision the requested resources (e.g., web server, application server, storage, database) according to an automated workflow process through a provisioning module. In an embodiment, the automated work flow processes conform to and comply with "best practices" as defined by industry standards (from ITIL). Configuration for the provisioned resources may be performed in an ad hoc manner—manually by a user through the service catalogue, for example. Alternatively, pre-stored configuration templates may be referenced from a database (such as a CMDB database of the Orchestration Platform 107 described below) and replicated for the environment or project. In still further embodiments, a configuration may be automatically generated based on user-specified criteria. After the resources have been provisioned and configured, further customization may be performed if necessary. Otherwise, automatic scripting processes may be performed to install requisite software for executing the application. If at any point during the automated provisioning and configuration processes an error or fault is encountered, integrated monitoring policies may be automatically applied to notify the system administrator and/or attempt to address the particular issue encountered.

According to an embodiment, orchestration of cloud computing services in a project environment is provided by the Orchestration Framework 107. In further embodiments, this governance may be extended to both a usage and policy level. The Orchestration Framework 107 may be implemented as a plurality of separate modules (such as Policy Management and Rules Engine 109) which function cooperatively to provide cross-vendor support. These modules may include functionality for policy enforcement and management by centralizing and standardizing management of client-specific policies to regulate and adjust infrastructure services against changing business needs. In an embodiment, the Policy Management and Rules Engine 109 may apply user-specific policies to provisioned resources dynamically, such that changes in operating circumstances can be accommodated automatically.

For example, a project environment that scales in resource consumption and usage can maintain proportional levels of policy management automatically, rather than requiring manual (and often inefficient and/or slow) changes to one or more configurations in the environment. For example, an environment that uses multiple servers each provisioned to run a software platform with a certain amount of licenses may be suddenly and dramatically expanded such that the number of licenses is no longer sufficient to support the number of users. Rather than manually identifying, selecting and upgrading (or downgrading) the software platforms executing on each of the multitude of servers, or even provisioning entirely new configurations with sufficient size, a single policy can be dynamically and automatically applied to perform a consistent update across the instances, without manual supervision. Thus, when a user is notified that the maximum number of provisioned licenses for a software platform has been met and that no further instances of the platform can be provisioned, the user may be able to dynamically create, and apply, a new policy wherein the platform is automatically upgraded to a version with a greater (or unlimited) number of licenses when the number of provisioned platforms exceeds the number of granted licenses under a prevailing license agreement.

According to another example of dynamic policy and rule management, a provisioned, executing server's memory utilization may be constantly monitored to prevent over utilization. If the server's memory utilization is detected to be above a pre-specified threshold, a policy may be dynamically applied to check if the provisioned, executing server can handle additional memory, and if the client has enabled scaling of the machine. If both of these cases are true, additional memory may be automatically increased in the server by provisioning additional memory through the Orchestration Framework 107, for example.

The Orchestration Framework 107 may also include a central source base (such as an instance of a storage service) for previously configured resources or entire computing environments. For example, the configurations (either or both of the operating settings and architecture) of previously provisioned resources and developed environments may be stored in a configuration management module of the Orchestration Framework 107, such as within, or used in conjunction with, a database such as a Configuration Management Database (CMDB). Accordingly, computing resources selected to implement a computing environment may be configured according to a default configuration, without requiring manual (and typically user-intensive) individual configuration. These operating configurations may include, but are not limited to: specific active and inactive network ports for a provisioned server; the location of the virtual machine or storage device associated with a virtual machine; the physical location of a cloud data center comprising the underlying physical hardware components hosting the virtual machines; and the operating system(s) executing on the virtual machines.

The previously requisitioned resources and developed environments may be used as a reference in subsequent provisioning or design processes. Storage of the particular configurations and environments may also be used during automated processes for future integration or software and policy updates. By facilitating the storage, referencing, and replication of computing environment designs and resource allocations, the infrastructure of the data center may be standardized and the set up and delivery time for cloud-operated applications may be reduced while maintaining the flexibility to design and deploy alternate and ad hoc configured environments.

In a further embodiment, alignment and integration among cloud computing resources provided by various cloud computing vendors is provided by an Orchestration Framework 107. This platform may be implemented to provide alignment and integration with the Information Technology Infrastructure Library (ITIL) standards of processes, thereby allowing cloud services to be managed as traditional information technology resources with standardized practices and controls. In further embodiments, the platform may also be configured to extend traditional ITIL processes by providing standard service management and service delivery functions to be extended to cloud computing services. Trouble shooting issues or monitoring new automated processes may also be performed in the Orchestration Framework 107.

In an embodiment, troubleshooting issues and/or monitoring new processes may be performed in the Orchestration Framework 107 automatically. For example, a monitoring tool may be executed in the integrated managed service framework 100 and tasked with detecting issues which arise during the continued execution of provisioned resources managed by the framework 100. A detected issue will generate an incident and/or change request (e.g., according to ITIL best practice standards), and stored. Policy management services implemented through the Orchestration Framework 107 may be subsequently used to identify and characterize the incident type and an appropriate resolution. Thereafter, the resolution identified may be performed automatically through the Orchestration Framework 107 automatically, and, once resolved (or if additional problems are incurred) the incident and change requests may be updated accordingly.

By employing standardized alignment and integration among the cloud computing resources through a single (web-based) portal, a consistent framework is provided which offers increased efficiency among and between the resources, and compliance to industry standards. This standardization may be achieved by connecting to the specific infrastructure and platforms in place as reusable services, and monitoring across all services to verify conformity with industry standards. Furthermore, standardization may also be achieved through the automatic application of consistent policies.

According to some embodiments, the integrated services framework 100 may be implemented as a remotely managed service operable to prompt, receive, and analyze consumer criteria; provision and configure resources, deploy applications, subscribe to service agreements among a plurality of platforms; and integrate the platforms and applications into a single (or plural, as desired) seamless working environment(s) operable to provide services to a plurality of consumers. Alternatively, the framework 100 may be implemented as a privately deployed service which generates dedicated, client-specific solutions deployed within a client's existing data environment (which may comprise both existing traditional and cloud data services).

As presented in FIGS. 2-5, example user interfaces (e.g., user interfaces 200, 300, 400, and 500) of an integrated services framework (e.g., the integrated services framework 100) are depicted, in accordance with embodiments of the present disclosure. In an embodiment, user interfaces 200, 300, 400, and 500 depicted in FIGS. 2-5 simulate the user interfaces through which a user of the integrated services framework are able to access, view, configure, and provision computing resources. User interfaces 200, 300, 400, and 500 presented in FIGS. 2-5 may be generated by the User Management framework 103 of a managed service framework 100, such as the framework 100 described above with respect to FIG. 1. In an embodiment, user interfaces 200, 300, 400, and 500 are accessible to a user through the web portal and may be generated specifically to correspond with an identified and/or authorized user. Management of computing resources (that is, accessing, viewing, configuring, and provisioning of computing resources) may be performed through user interfaces 200, 300, 400, and 500 on a plurality of levels. For example, individual computing resources may be managed on one or more user interfaces (e.g., user interface 400, 500), while the multiple computing resources comprising a computing environment may be managed collectively on a separate user interface (e.g., user interface 300). Finally, multiple environments which collaboratively form a project may be managed on an aggregate level through another user interface (e.g., user interface 200).

FIG. 2 depicts an example user interface 200 for provisioning and managing infrastructure resources in a project. As previously discussed, a project may include one or more associated or related environments, each environment comprising one or more provisioned computing resources. In an embodiment, user interface 200 provides management functionality to a user for a specific project corresponding to the user. As depicted in FIG. 2, user interface 200 includes an environment management panel 201, project details panel 203, and project activity panel 209. Individual and/or collective management of the environments comprising the project depicted in user interface 200 may be performed in environment management panel 201. As shown, environment management panel 201 includes functionality to search for particular environments and/or computing resources (e.g., through a search field). An environment or particular computing resource may be searched for by, for example, entering keywords associated with the environment or computing resource in the search field. Items matching the searched for keyword may be displayed in, for example, environment window 207 by highlighting or other visual indicia. User interface 200 may also include functionality to add environments (e.g., through the button labeled "Add Environment"). In an embodiment, actuating button Add Environment may prompt the user to select a pre-configured and provisioned environment. Once selected, the environment may be appended as an entry in environment window 207.

Other functionality provided in user interface 200 may include functionality to backup and/or clone an environment (e.g., by actuating buttons labeled Backup and Clone, respectively). Actuating button Clone, for example, may automatically replicate (e.g., provision and configure) a selected environment in environment window 207 and automatically append the environment to environment window 207. Actuating button Backup may duplicate all environments in the environment window 207 as a separate, alternate project. Environment window 207 allows a user to view the environments comprising the project. As presented in FIG. 2, the environments are listed as "Development," "Test," "Performance," "Production," and "Q/A." In one embodiment, actuating on an environment in environment window 207 generates user interface 300 (described below), which allows a user to manage the environment separately. Environment attributes such as an environment's name, current power state, known alerts, and budgets may be presented in environment window 207. In a further embodiment, budgeting for one or more environments in the project may be expressed as a percentage or fraction of costs expended over budget allotted. Thus, for example, the budget situation for the "Development" environment may be expressed as a value corresponding to costs expended to provision and operate the environment (e.g., variable "X") over a value corresponding to the budget allotted for the environment (e.g., variable "Y"). In addition, environment window 207 may provide individual management of an environment (e.g., via More Actions drop down bar). Individual management functionality provided through More Actions drop down bar may include, for example, removing a selected environment from the project, deleting an environment, pausing an operation of an environment or turning an environment off.

Project details panel 203 may provide details regarding the project. These details may include, for example, the name of the project, a description of the project, the creator and/or administrator of the project and dates of operation of the project. These fields may be editable by authorized users. In further embodiments, project details panel 203 may include an environment summary panel 205, which provides details for the environments in the project. These details may include, but are not limited to, the number of environments in the project, and infrastructure attributes (e.g., processing cores, average processing speeds, average memory sizes) of the environments in the project.

Project activity panel 209 (labeled as "Project Activity Feed") may provide information on recent activity or actions performed relevant to the project. This information may include, for example, the addition of new authorized users to an environment or infrastructure component in the project, the modification of the power states to one or more infrastructure resources in one or more environments of the project, infrastructure provisioning requests, scheduled announcements, etc. Functionality such as filtering of the information provided in project activity panel 209 (via the drop down menu labeled "Filter") and viewing less recent information (via button labeled "View More Activity") may also be provided through user interface 200.

User Interface 200 provides a user the ability to manage entire projects comprising multiple, affiliated environments. For example, turning on or off an environment may also be performed by an authorized user in User Interface 200 through environment window 207, for example. Thus, rather than individually manage the power states of each individual instance in each environment, all instances in an environment may be thusly managed. In addition, an entire environment may be cloned (that is, a like number of instances may be provisioned with identical configurations) also through User Interface 200 through a console or window. Cloning entire environments would provide users the functionality to replicate large environments more conveniently and with increased efficiency.

Figure 3:
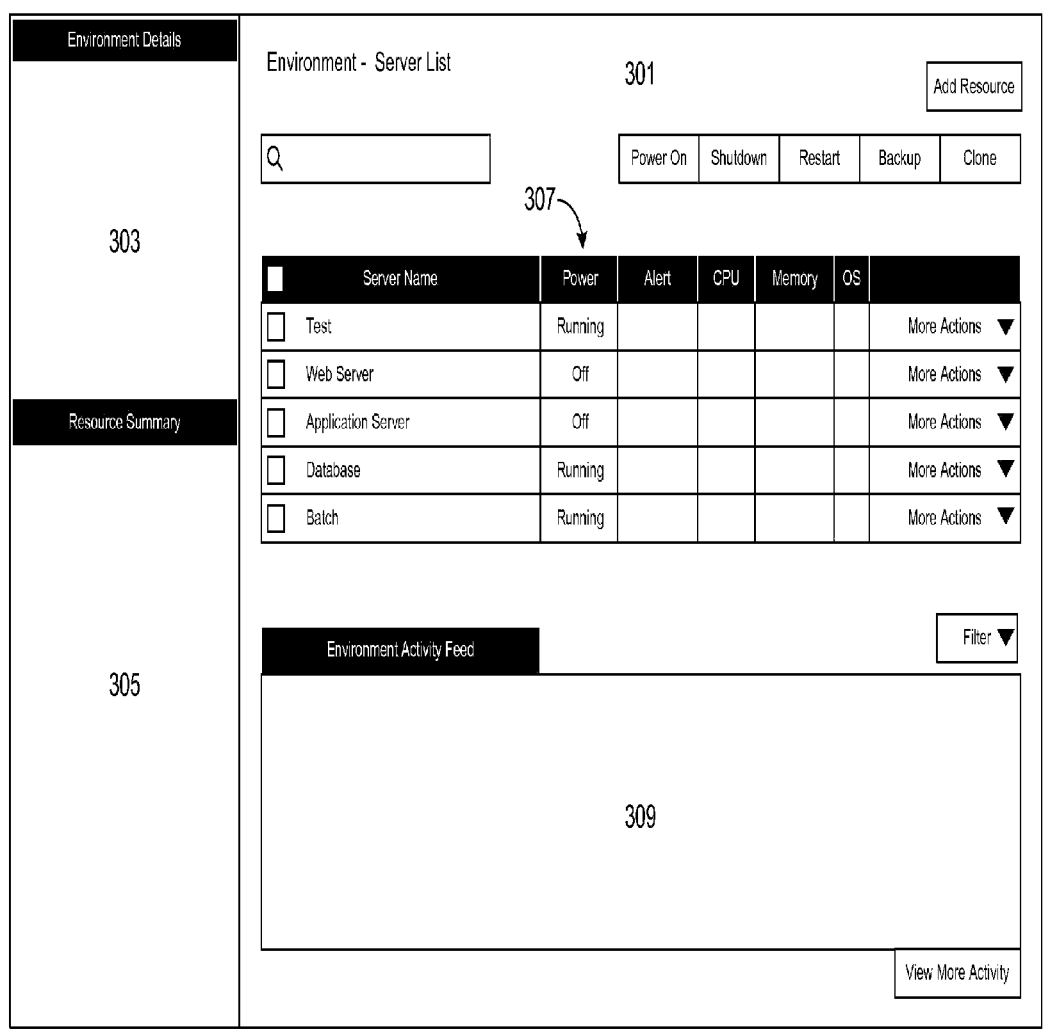
FIG. 3 is an example user interface for provisioning and managing infrastructure resources in an environment, in accordance with embodiments of the present disclosure.

FIG. 3 depicts an example user interface 300 for provisioning and managing infrastructure resources in an environment. As previously discussed, an environment may comprise one or more provisioned computing resources. As distinguished from user interface 200, user interface 300 provides management functionality to a user for a specific environment, rather than an entire project, corresponding to the user. As depicted in FIG. 3, user interface 300 includes an resource management panel 301, environment details panel 303, and environment activity panel 309. Individual and/or collective management of the resources comprising the environment depicted in user interface 300 may be performed in resource management panel 301. As shown, resource management panel 301 includes functionality to search for particular computing resources (e.g., via a search field). A particular computing resource may be searched for by, for example, entering keywords associated with the computing resource in the search field. Items matching the searched for keyword may be displayed in, for example, resource window 307 by highlighting or other visual indicia. User interface 300 may also include functionality to add resources (e.g., through the button labeled "Add Resource"). In an embodiment, actuating button Add Resource may prompt the user to select a pre-configured and provisioned resource, such as a server, a network component, or storage device. Once selected, the resource may be appended as an entry in resource window 307.

Other functionality provided in user interface 300 may include functionality to power on, shutdown, restart, backup and/or clone one or more resources displayed in resource window 307 (e.g., by actuating buttons labeled Power On, Shutdown, Restart, Backup and Clone, respectively). Actuating button Power On, Shutdown, or Restart, for example, may perform the operation on a selected resource in resource window 307, or for all resources in resource window 307 if no resource is selected. Actuating button Clone, for example, may automatically replicate (e.g., provision and configure) a selected resource in resource window 307 and automatically append the environment to resource window 307. Actuating button Backup may duplicate all resources in the resource window 307 as a separate, alternate environment. Resource window 307 allows a user to view the resources comprising the environment. As presented in FIG. 3, the resources are listed as "Test," "Web Server," "Application Server," "Database," and "Batch." Resource attributes such as a resource's name, current power state, known alerts, processing speed, memory, and operating system(s) may be presented in resource window 307. In addition, resource window 307 may provide individual management of a resource (e.g., via More Actions drop down bar). Individual management functionality provided through More Actions drop down bar may include, for example, removing a selected resource from the environment, deleting a resource, or pausing an operation of a resource.

Environment details panel 303 may provide details regarding the environment. These details may include, for example, the name of the environment, a description of the environment, the creator and/or administrator of the environment and dates of operation of the environment. These fields may be editable by authorized users. In further embodiments, environment details panel 303 may include a resources summary panel 305, which provides details for the resources in the environment. These details may include, but are not limited to, the number of resources in the Environment, and infrastructure attributes (e.g., number of processing cores, average processing speeds, average memory sizes) of the resources in the Environment.

Environment activity panel 309 (labeled as "Environment Activity Feed") may provide information on recent activity or actions performed relevant to the Environment. This information may include, for example, the addition of new authorized users to the environment or an infrastructure component in the Environment, the modification of the power states to one or more infrastructure resources of the project, infrastructure provisioning requests, scheduled announcements, etc. Functionality such as filtering of the information provided in environment activity panel 309 (via the drop down menu labeled "Filter") and viewing less recent information (via button labeled "View More Activity") may also be provided through user interface 300.

Figure 4:
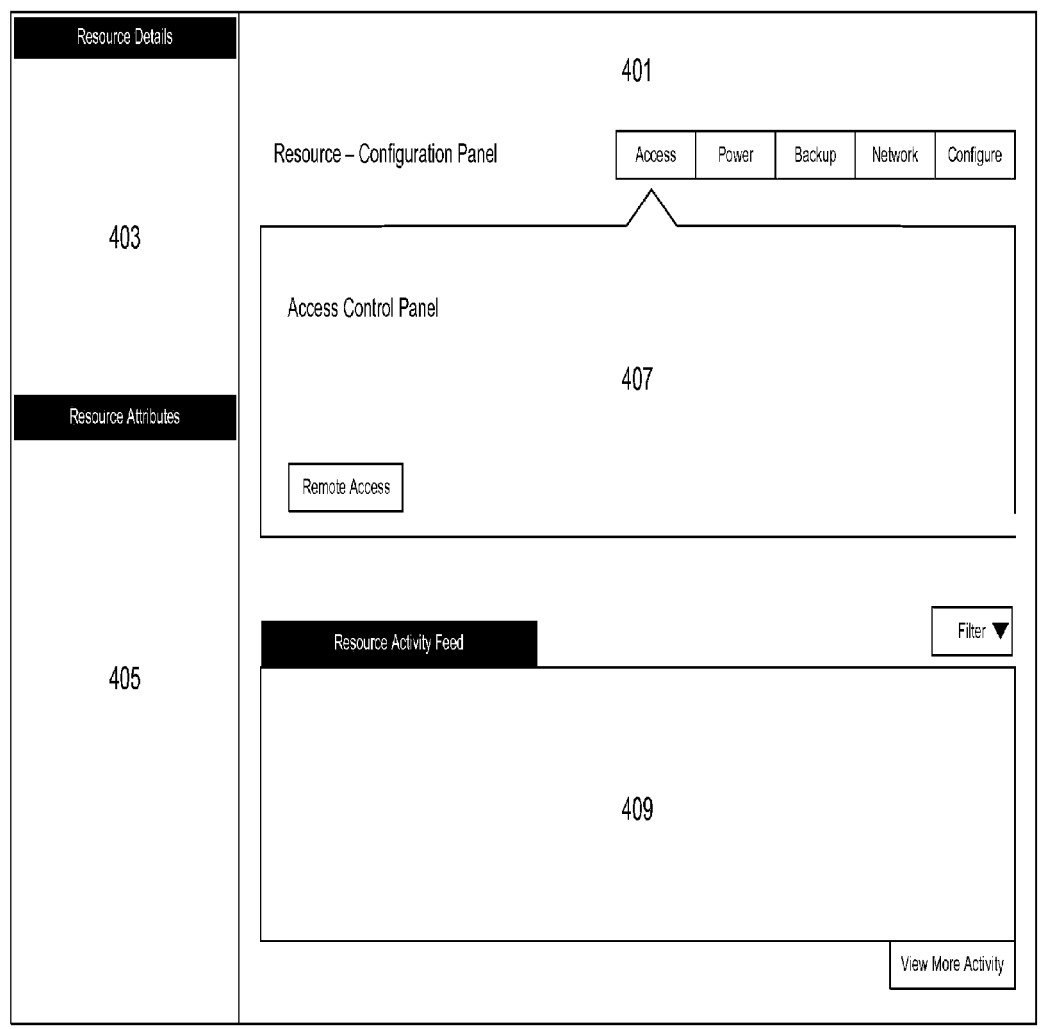
FIG. 4 is an example user interface for accessing an infrastructure resource, in accordance with embodiments of the present disclosure.

FIG. 4 depicts an example user interface 400 for accessing a provisioned infrastructure resource. As distinguished from user interfaces 200 and 300, user interface 400 provides information to a user for a specific infrastructure resource, rather than an entire project or environment, corresponding to the user. As depicted in FIG. 4, user interface 400 includes a resource configuration panel 401, resource details panel 403, and resource activity panel 409. Individual management of individual resources may be performed in resource management panel 401. Resource configuration panel 401 selectively provides functionality corresponding to access, power, backup, networking, and configuration of a resource. These functionalities can be alternately toggled by actuating a corresponding button (e.g., buttons Access, Power, Backup, Network, and Configure, respectively). As depicted in FIG. 4, resource configuration panel 401 provides accessibility functionality (identifiable by the position of the indicator below the Access button) corresponding to the resource through accessibility window 407. Accessibility functionality may include for example, providing remote access (via remote access button), and may provide details regarding resource accesses. These details may include, for example, the last date and time a resource was accessed by a user and the access history for all users with respect to the resource.

Resource details panel 403 may provide details regarding the resource. These details may include, for example, the name of the resource, a description of the resource, the creator and/or administrator of the resource and dates of operation of the resource. These fields may be editable by authorized users. In further embodiments, resource details panel 403 may include a resources attributes panel 405, which provides details for the particular resource's attributes. These details may include, but are not limited to, the number of processing cores, processing speeds, storage sizes, operating system(s) and IP addresses) of the resource.

Resource activity panel 409 (labeled as "Resource Activity Feed") may provide information on recent activity or actions performed relevant to the resource. This information may include, for example, the addition of new authorized users to the infrastructure component, the modification of the power states to the infrastructure resource, additional infrastructure provisioning requests, scheduled announcements, etc. Functionality such as filtering of the information provided in resource activity panel 409 (via the drop down menu labeled "Filter") and viewing less recent information (via button labeled "View More Activity") may also be provided through user interface 400.

Figure 5:
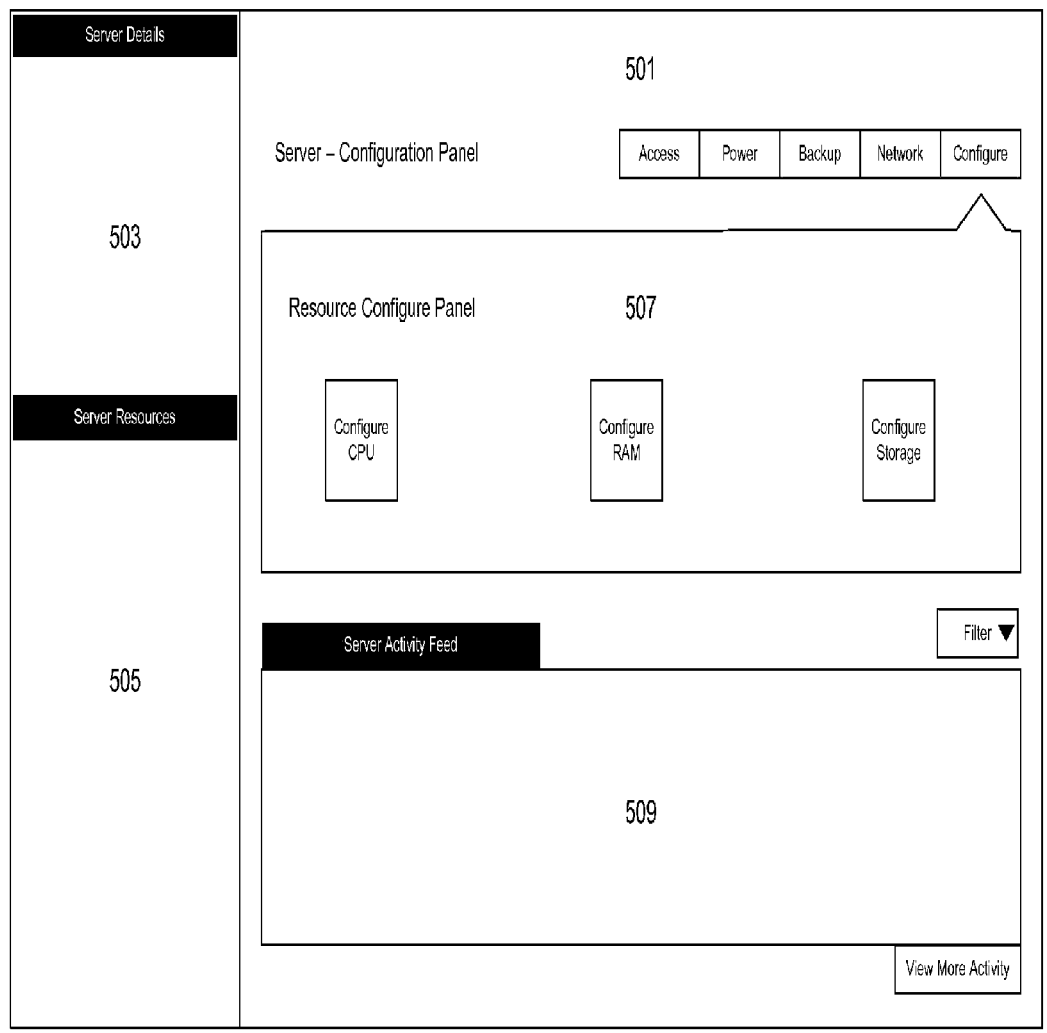
FIG. 5 is an example user interface for configuring an infrastructure resource, in accordance with embodiments of the present disclosure.

FIG. 5 depicts an example user interface 500 for configuring a provisioned infrastructure resource and presents an alternate user interface to FIG. 4 for performing user selected functionality. As in user interface 400, resource configuration panel 501 is able to selectively provide functionality corresponding to access, power, backup, networking, and configuration of a resource. These functionalities can be alternately toggled by actuating a corresponding button (e.g., buttons Access, Power, Backup, Network, and Configure, respectively). As depicted in FIG. 5, resource configuration panel 501 provides configuration functionality (identifiable by the position of the indicator below the Configure button) corresponding to the resource through configuration window 507. Configuration functionality may include for example, configuring attributes for the resource, such as configuring the processing, memory, and storage capabilities of the resource.

Resource details panel 503, resources attributes panel 505 and Resource activity panel 509 (labeled as "Resource Activity Feed") operate similarly to correspondingly numbered elements 403, 405, and 409 described above with respect to FIG. 4 and user interface 400.

Figure 6:
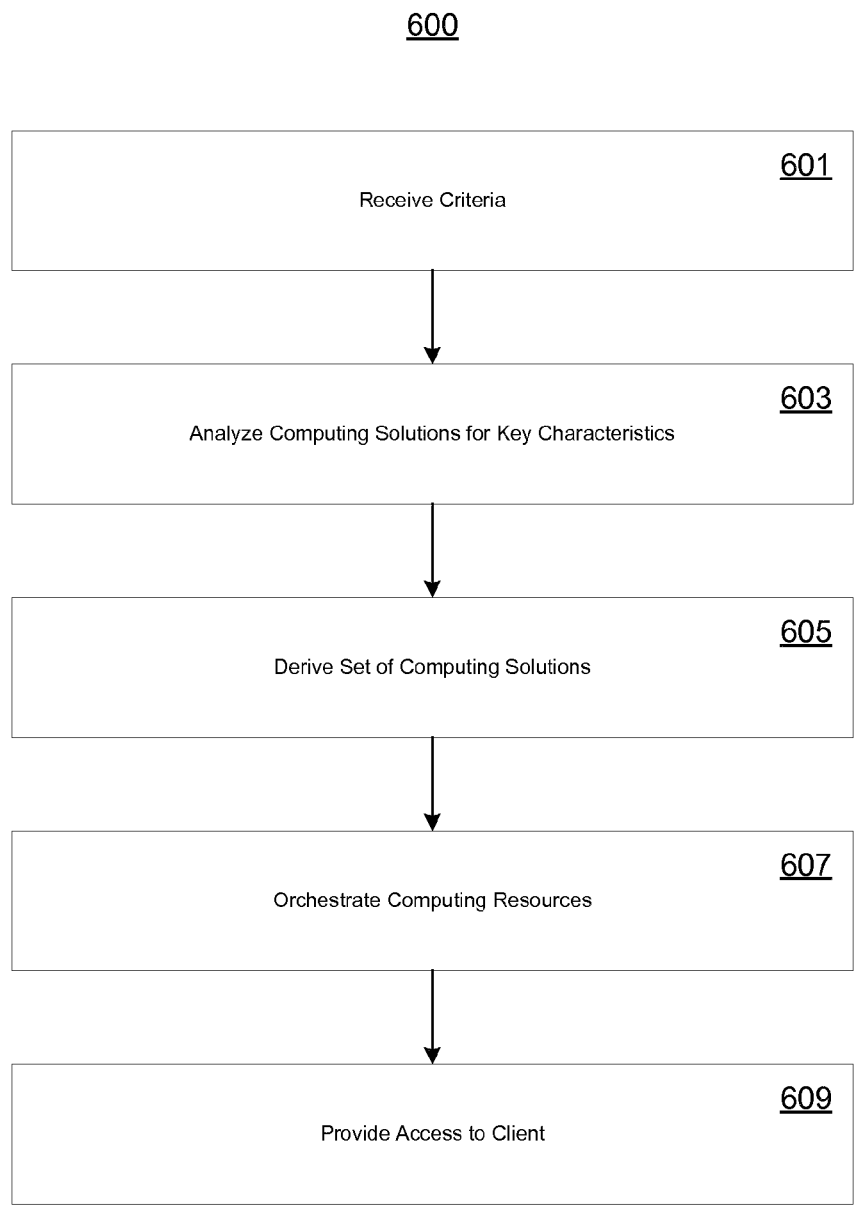
FIG. 6 is a flowchart of a process for implementing an integrated, cross-platform environment providing dynamic orchestration and user access control, in accordance with embodiments of the present disclosure.

As presented in FIG. 6, a flowchart 600 of a process for implementing an integrated, cross-platform environment providing dynamic orchestration and user access control is depicted, in accordance with embodiments of the present disclosure. The integrated, cross-platform environment may be implemented as, for example, an environment provisioned and configured through the integrated managed service framework 100 described above with respect to FIG. 1. Operations 601-609 of flowchart 600 describe exemplary operations comprising the process in accordance with the various embodiments herein described.

At operation 601, desired features of an integrated, cross-platform environment are received from a client or user. The desired features may be comprised as, for example, a criteria corresponding to key characteristics of computing resources. In an embodiment, the desired features may be obtained from a client or user by querying the client or user with a list of pre-generated, directed questions. The questions may pertain to intended usages, prioritized qualities, critical features, etc. Answers to the questions are obtained, and key characteristics and desired features of an integrated, cross-platform environment are derived from the answers given by the user. The key characteristics may be derived by, for example, assigning a score or value to a user's answer, depending on the answer, according to a range, and matching the user's aggregate score to a particular computing resource or configuration of resources.

At operation 603, the key characteristics of available computing resources (e.g., computing resources offered in a service catalogue of FIG. 1) maybe analyzed (or referenced, if pre-stored) and compared to the desired features and/or user criteria. At operation 605, a configuration of computing resources is automatically derived from the available computing resources which most complies with the user criteria. Operation 605 may also include, for example, comparing candidate configurations with the user-supplied criteria to determine the configuration with the greatest compliance. In further embodiments, each candidate configuration may also be validated for compatibility. Thus, incompatible (e.g., non-operational) combinations of resources (e.g., vendor proprietary platforms on another vendor's infrastructure) will not be selected as a suitable configuration.

At operation 607, the configuration derived during operation 605 is automatically orchestrated to implement a provisioned, integrated, cross-platform environment. According to an embodiment, orchestration may include automatically provisioning a set of computing resources according to the configuration derived during operation 605. According to further embodiments, orchestration may also include automatically standardizing the set of computing resources by applying pre-configured set of user-defined policies. These policies may include, for example, resource configurations (e.g., software or firmware versions) and may be dynamically applied to instances of computing resources in some or all of the environments corresponding to a user. According to still further embodiments, user-defined policies can be added, updated, or removed at any time, and the application thereto may be performed dynamically across applicable instances, resources, and/or entire environments.

Finally, access to a client user to the set of computing resources through the integrated cross-platform environment is proved at operation 609. In an embodiment, the specific avenue of access may comprise generating a web-based portal to access the computing resources. In some embodiments, access may be granted to other users designated by the client. The access may be granted to users individually, or, to one or more groups or classes of users. Access to the set of computing resources may include providing access to a user access control module. In still further embodiments, in addition to access to the integrated cross-platform environment, other, pre-generated environments affiliated with a user may also become accessible at operation 609.

Figure 7:
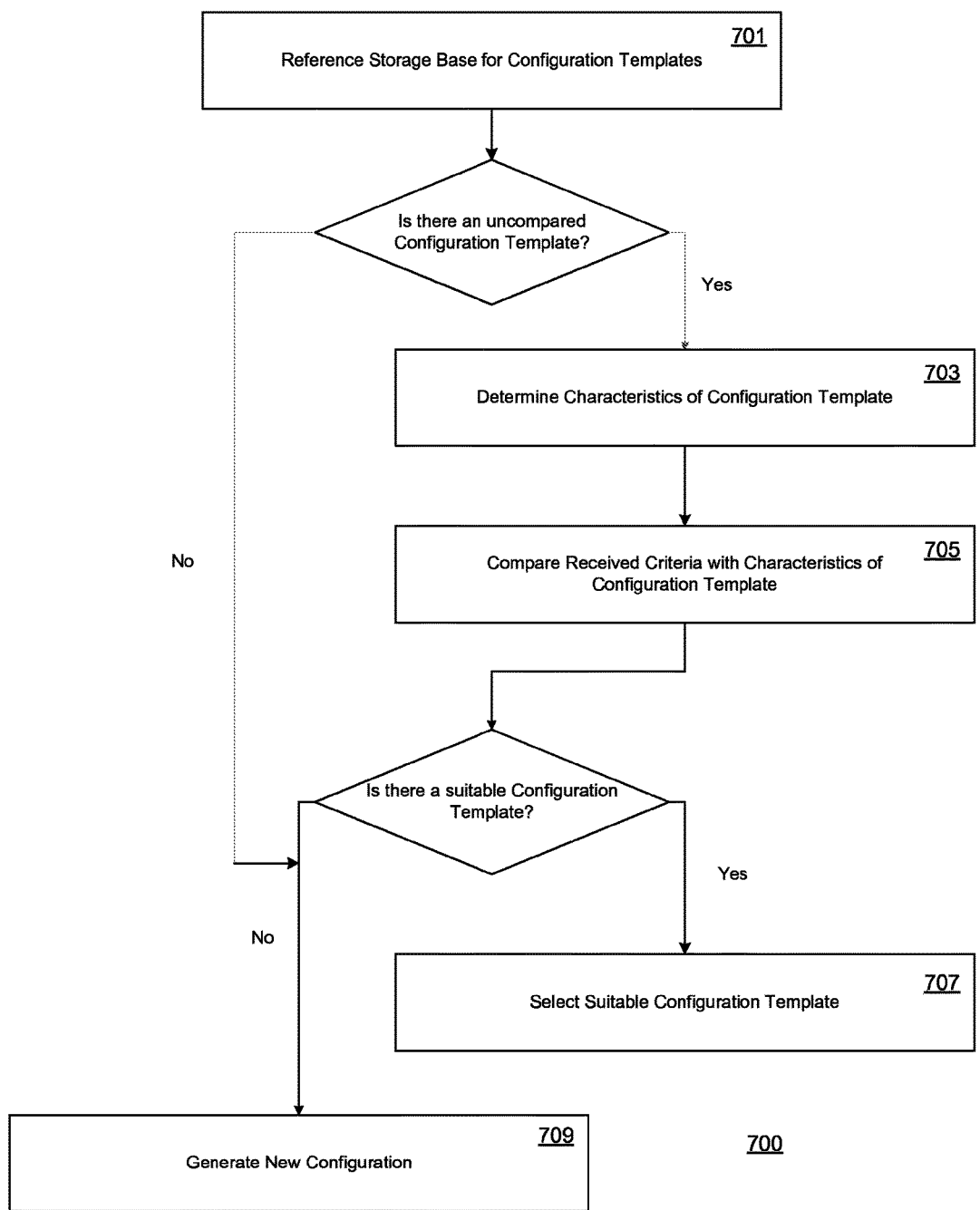
FIG. 7 is a flowchart of a process for selecting a pre-stored configuration template in a storage base, in accordance with embodiments of the present disclosure.

According to alternate embodiments, the automatic derivation of a suitable configuration of computing resources performed in operation 605 may be performed by referencing pre-stored configuration templates. FIG. 7 depicts a flowchart 700 of a process for selecting a pre-stored configuration template in a storage base, in accordance with embodiments of the present disclosure. Operations 701-705 of flowchart 700 describe exemplary operations comprising the process in accordance with the various embodiments herein described. In an embodiment, operations 701-705 may be performed entirely during operation 605 of the process described in flowchart 600.

At operation 701, a storage base is referenced to evaluate pre-stored configuration templates. The storage base may be implemented as, for example, a database of templates in an orchestration framework 107. If no templates exist, or, alternatively, if all existing templates have been evaluated and deemed unsuitable, the process proceeds to operation 709 and a new configuration is determined. If, however, additional configuration templates are found in the storage base, the key characteristics and features of an environment according to the template is derived and compared with the supplied user criteria at operation 703. Key characteristics may include inter alia: size, cost effectiveness, security, portability, and reliability of provisioned components, for example. If the configuration of an environment according to the template is deemed suitable, the configuration according to the template is selected at operation 707 and used as the configuration. Suitability may be deemed according to a complete, substantial, or even partial compliance with user supplied criteria, as specified by the user. In still further embodiments, a new configuration derived at operation 709 may be stored as a configuration template in the storage base.

Figure 8:
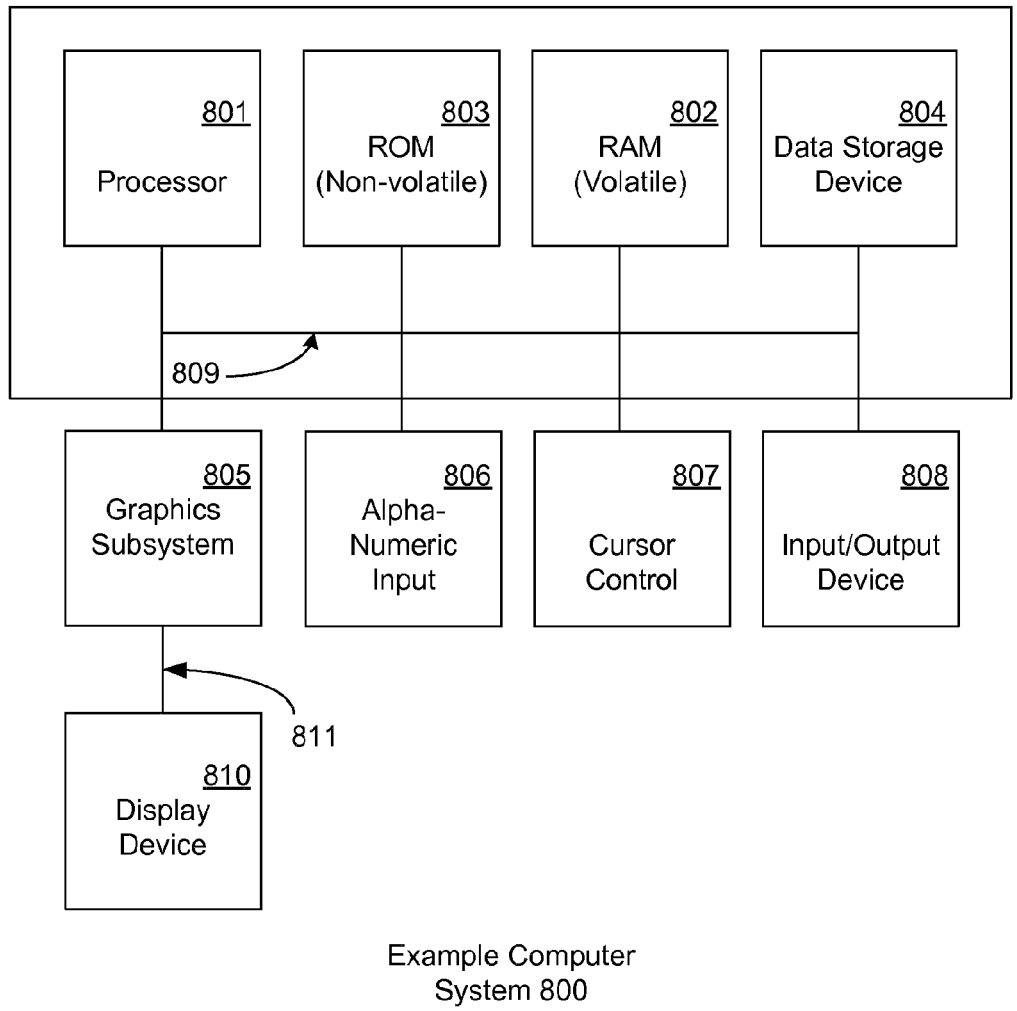
FIG. 8 is a block diagram of a computing system upon which embodiments of the claimed subject matter may be implemented, in accordance with embodiments of the present disclosure.

As presented in FIG. 8, an example computing system upon which embodiments of the presently claimed subject matter can be implemented includes a general purpose computing system environment, such as computing system 800. In its most basic configuration, computing system 800 typically includes at least one processing unit 801 and memory, and an address/data bus 809 (or other interface) for communicating information. Depending on the exact configuration and type of computing system environment, memory may be volatile (such as RAM 802), nonvolatile (such as ROM 803, flash memory, etc.) or some combination of the two. In further embodiments, system 800. Computing system 800 may be used to host one or more instances of one or more virtual machines. According to some embodiments, virtual machines may be dynamically provisioned by the computing system 800 and other, communicatively computing systems.

Computer system 800 may also comprise an optional graphics subsystem 805 for presenting information to the computer user, e.g., by displaying information (such as user-interface 200) on an attached display device 810, connected by a video cable 811. Additionally, computing system 800 may also have additional features/functionality. For example, computing system 800 may also include additional storage (removable and/or non-removable) including, but not limited to, magnetic or optical disks or tape. Such additional storage is illustrated in FIG. 8 by data storage device 804. Computer storage media includes volatile and nonvolatile, removable and non-removable media implemented in any method or technology for storage of information such as computer readable instructions, data structures, program modules or other data. RAM 802, ROM 803, and data storage device 804 are all examples of computer storage media.

Computer system 800 also comprises an optional alphanumeric input device 806, an optional cursor control or directing device 807, and one or more signal communication interfaces (input/output devices, e.g., a network interface card) 808. Optional alphanumeric input device 806 can communicate information and command selections to central processor(s) 801. Optional cursor control or directing device 807 is coupled to bus 809 for communicating user input information and command selections to central processor 801. Signal communication interface (input/output device) 808, also coupled to bus 809, can be a serial port. Communication interface 809 may also include wireless communication mechanisms. Using communication interface 809, computer system 800 can be communicatively coupled to other computer systems over a communication network such as the Internet or an intranet (e.g., a local area network), or can receive data (e.g., a digital television signal).

Although the subject matter has been described in language specific to structural features and/or processological acts, it is to be understood that the subject matter defined in the appended claims is not necessarily limited to the specific features or acts described above. Rather, the specific features and acts described above are disclosed as example forms of implementing the claims.

By using any of the systems provided above, a cloud computing consumer can manage disparately hosted services and resources through a single, integrated portal, thereby allowing the consumer to efficiently publish and apply policies, request optimal configurations of resources and services, and standardize integration and alignment of cloud-hosted platforms to comply with industry standards. This platform may be deployed as an public portal configured to automate and manage cloud computing services remotely from a user or organization as well as a private system under the direct management of a user or organization and customized to provide services for the user or organization.

What is claimed is:

1. A method comprising:
   in a multi-vendor cloud orchestration system comprising a cloud computing service tool executed by a processor in the system:
   receiving, by the processor, a computing environment input comprising criteria that specify a computing environment for implementation;
   assigning, by the processor, an aggregate score to the computing environment input based on a score range for the criteria;
   determining, by the processor, characteristics of a set of computing resources offered by cloud resource vendors;
   determining, by the processor, a subset of the set of computing resources responsive to the aggregate score, the subset including resource members that comprise a cross-platform implementation of the computing environment;
   validating, by the processor, the subset of computing resources for inter-compatibility;
   searching a template database comprising configuration templates to determine, by the processor, a selected configuration template for provisioning at least one of the resource members;
   defining a first user-specified policy rule applicable to performance of the computing environment;
   provisioning the subset of resource members to implement the cross-platform implementation of the computing environment;
   monitoring a performance of the computing environment;
   determining that a maximum number of available licenses have been provisioned under the first user-specified policy rule;
   notifying a user that the maximum number of available licenses have been provisioned;
   defining a second user-specified policy rule from the user in response to notifying the user that the maximum number of available licenses have been provisioned;
   and
   automatically and dynamically applying the second user-specified policy rule to upgrade at least one resource member of the cross-platform implementation of the computing environment to a new version with a greater number of available licenses than under the first user-specified policy rule.

2. The method of claim 1, where determining the characteristics comprises: searching a service catalog comprising descriptions of available resources offered by the cloud resource vendors.

3. The method of claim 2, where searching the service catalog comprises: searching virtual machines, operating systems, applications, workflows, or any combination thereof in the service catalog, for implementing the computing environment.

4. The method of claim 1, further comprising:
   creating a computing environment template specifying the subset of computing resources; and
   storing the computing environment template in the template database for future comparison against a subsequent computing environment input.

5. The method of claim 1, further comprising:
   querying a client with directed questions pertaining to features of the computing environment for implementation; and
   receiving, as the computing environment input, answers to the directed questions from the client.

6. A machine comprising:
   a template database comprising configuration templates for computing resources offered by cloud resource vendors;
   a signal communication interface operable to receive a specification of a computing environment for deployment with cloud services;
   a program storage device storing a cloud computing service tool; and
   a system processor in communication with the template database and the program storage device, the cloud computing service tool comprising system instructions configured for execution by the system processor to:
   determine an aggregate score for the specification according to a pre-defined score range;
   determine characteristics of the computing resources offered by the cloud resource vendors;
   identify a selected set of the computing resources responsive to the aggregate score, the selected set providing an implementation of the computing environment across multiple different cloud resource vendors among the cloud resource vendors;
   validate the selected set of the computing resources for compatibility;
   search the template database to determine a selected configuration template for provisioning at least one of the resource members;
   receive a first user-specified policy rule applicable to performance of the computing environment;
   provision the subset of resource members to implement the cross-platform implementation of the computing environment;
   monitor a performance of the computing environment;
   determine that a maximum number of available licenses have been provisioned under the first user-specified policy rule;
   notify a user that the maximum number of available licenses have been provisioned;
   receive a second user-specified policy rule from the user in response to notifying the user that the maximum number of available licenses have been provisioned;
   and
   automatically and dynamically apply the second user-specified policy rule to upgrade at least one resource member of the cross-platform implementation of the computing environment to a new version with a greater number of available licenses than under the first user-specified policy rule.

7. The machine of claim 6, where:
the system instructions are further configured to:
  obtain client answers to pre-generated questions concerning the computing environment; and
  derive characteristics of the computing environment from the client answers and the aggregate score.

8. The machine of claim 7, where:
the system instructions are configured to identify by:
  comparing candidate configurations for the computing environment for compliance with the characteristics.

9. The machine of claim 8, where:
the multiple different cloud resource vendors comprise multiple different public cloud vendors.

10. The machine of claim 8, where:
the multiple different cloud resource vendors comprise a public cloud vendors and a different private cloud vendor.

11. The machine of claim 8, where:
the system instructions are further configured to:
  generate a resource functionality control interface panel comprising resource control user interface elements; and
  responsive to the resource control user interface elements, control a particular resource among the resource members after is it provisioned.

12. The machine of claim 8, where:
the system instructions are further configured to:
  generate a resource configuration user interface panel comprising resource configuration user interface elements; and
  responsive to the resource configuration user interface elements, configure a particular resource among the resource members after is it provisioned.

13. A machine comprising:
a template database comprising configuration templates for computing resources offered by available cloud resource vendors;
a signal communication interface operable to receive a specification of a computing environment for deployment as cloud services;
a program storage device storing a cloud computing service tool; and
a system processor in communication with the template database and the program storage device, the cloud computing service tool comprising system instructions configured for execution by the system processor to:
  determine characteristics of the computing resources offered by the cloud resource vendors;
  identify a selected set of the computing resources responsive to the configuration templates available in the template database, the selected set providing an implementation of the computing environment across multiple different cloud resource vendors among the available cloud resource vendors;
  validate the selected set of the computing resources for compatibility;
  search the template database to determine a selected configuration template for provisioning at least one of the resource members;
  initiate provisioning of at least a portion of the computing environment according to the selected configuration template;
  receive a first user-specified policy rule applicable to performance of the computing environment;
  monitor a performance of the computing environment;
  determine that a maximum number of available licenses have been provisioned under the first user-specified policy rule;
  notify a user that the maximum number of available licenses have been provisioned;
  receive a second user-specified policy rule from the user in response to notifying the user that the maximum number of available licenses have been provisioned;
  and
  automatically and dynamically apply the second user-specified policy rule to upgrade at least one resource member of the cross-platform implementation of the computing environment to a new version with a greater number of available licenses than under the first user-specified policy rule.

14. The machine of claim 13, where:
the system instructions are further configured to:
  creating a computing environment template specifying the selected set of the computing resources; and
  store the computing environment template in the template database for future comparison against a subsequently received specification of a computing environment.

15. The machine of claim 13, where:
the system instructions are further configured to:
  obtain client answers to pre-generated questions concerning the computing environment; and
  derive client characteristics of the computing environment from the client answers.

16. The machine of claim 15, where:
the system instructions are configured to identify by:
  comparing the client characteristics against the configuration templates in the configuration database.

17. The machine of claim 16, where:
the configuration templates specify implementation characteristics for candidate computing environments.

18. The machine of claim 17, where:
the configuration templates specify implementation characteristics for a public cloud resource vendor and a private cloud resource vendor among the multiple different cloud resource vendors.

19. The method of claim 1, further comprising:
automatically and dynamically applying the second user-specified policy rule to upgrade at least one resource member of a second computing environment to a new version with a greater number of available licenses than under the first user-specified policy rule.

20. The machine of claim 6, where:
the system instructions are further configured to:
  automatically and dynamically apply the second user-specified policy rule to upgrade at least one resource member of a second computing environment to a new version with a greater number of available licenses than under the first user-specified policy rule.

21. The machine of claim 13, where:
the system instructions are further configured to:
  automatically and dynamically apply the second user-specified policy rule to upgrade at least one resource member of a second computing environment to a new version with a greater number of available licenses than under the first user-specified policy rule.

* * * * *